(12) United States Patent
Makovsky et al.

(10) Patent No.: US 10,819,560 B2
(45) Date of Patent: Oct. 27, 2020

(54) ALERT MANAGEMENT SYSTEM AND METHOD OF USING ALERT CONTEXT-BASED ALERT RULES

(71) Applicant: ServiceNow, Inc., Santa Clara, CA (US)

(72) Inventors: Bnayahu Makovsky, Savyon (IL); Dov Miron, Petach Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 265 days.

(21) Appl. No.: 15/940,559

(22) Filed: Mar. 29, 2018

(65) Prior Publication Data
US 2019/0306009 A1    Oct. 3, 2019

(51) Int. Cl.
| | |
|---|---|
| *H04L 12/24* | (2006.01) |
| *G06Q 10/08* | (2012.01) |
| *G06F 9/54* | (2006.01) |
| *G06Q 10/10* | (2012.01) |
| *G06Q 10/00* | (2012.01) |
| *G06Q 10/06* | (2012.01) |

(52) U.S. Cl.
CPC .......... *H04L 41/0609* (2013.01); *G06F 9/542* (2013.01); *G06Q 10/063* (2013.01); *G06Q 10/087* (2013.01); *G06Q 10/10* (2013.01); *G06Q 10/103* (2013.01); *G06Q 10/20* (2013.01); *H04L 41/0613* (2013.01)

(58) Field of Classification Search
CPC .... G06F 9/542; G06Q 10/063; G06Q 10/087; G06Q 10/10; G06Q 10/103; G06Q 10/20; H04L 41/0609; H04L 41/0613
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |

(Continued)

OTHER PUBLICATIONS

Krishnamurthy B. et al.; "Yeast: A General Purpose Event-Action System", vol. 21, No. 10, Oct. 1, 1995; pp. 845-857.

(Continued)

*Primary Examiner* — Gil H. Lee
(74) *Attorney, Agent, or Firm* — Fletcher Yoder PC

(57) ABSTRACT

An alert management system for a configuration management database (CMDB) platform includes a client instance configured to: apply a first filter of an alert rule to CMDB alerts to select a first alert based on context of the first alert and apply a second filter of the alert rule to the CMDB alerts to select a second alert based on context of the second alert, wherein the context of the first and second alerts includes details regarding the first and second alerts and associated configuration items (CIs). The client instance is also configured to: evaluate at least one condition of the alert rule using the context of the first and/or second alert; and in response to evaluating the at least one condition of the alert rule to be true, performing at least one action of the alert rule using the context of the first and/or second alert.

19 Claims, 11 Drawing Sheets

(56) References Cited

U.S. PATENT DOCUMENTS

| | | | |
|---|---|---|---|
| 7,043,659 B1 * | 5/2006 | Klein | H04L 41/0631 714/26 |
| 7,131,037 B1 | 10/2006 | LeFaive | |
| 7,170,864 B2 | 1/2007 | Matharu | |
| 7,392,300 B2 | 6/2008 | Anantharangachar | |
| 7,610,512 B2 | 10/2009 | Gerber | |
| 7,617,073 B2 | 11/2009 | Trinon | |
| 7,685,167 B2 | 3/2010 | Mueller | |
| 7,689,628 B2 | 3/2010 | Garg | |
| 7,783,744 B2 | 8/2010 | Garg | |
| 7,890,802 B2 | 2/2011 | Gerber | |
| 7,930,396 B2 | 4/2011 | Trinon | |
| 7,933,927 B2 | 4/2011 | Dee | |
| 7,934,248 B1 * | 4/2011 | Yehuda | H04L 41/069 709/224 |
| 7,936,863 B2 | 5/2011 | John et al. | |
| 7,945,860 B2 | 5/2011 | Vambenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,224,683 B2 | 7/2012 | Manos | |
| 8,266,096 B2 | 9/2012 | Nvarrete | |
| 8,380,645 B2 | 2/2013 | Kowalaski | |
| 8,457,928 B2 | 6/2013 | Dang | |
| 8,478,569 B2 | 7/2013 | Scarpelli | |
| 8,494,977 B1 * | 7/2013 | Yehuda | G06Q 10/00 706/11 |
| 8,554,750 B2 | 10/2013 | Rangaranjan | |
| 8,646,093 B2 | 2/2014 | Myers | |
| 8,674,992 B2 | 3/2014 | Poston | |
| 8,689,241 B2 | 4/2014 | Naik | |
| 8,743,121 B2 | 6/2014 | De Peuter | |
| 8,745,040 B2 | 6/2014 | Kowalski | |
| 8,812,539 B2 | 8/2014 | Milousheff | |
| 8,818,994 B2 | 8/2014 | Kowalski | |
| 8,887,133 B2 | 11/2014 | Behnia | |
| 8,904,364 B2 | 12/2014 | Pechanec et al. | |
| 9,015,188 B2 | 4/2015 | Behne | |
| 9,037,536 B2 | 5/2015 | Vos | |
| 9,065,783 B2 | 6/2015 | Ding | |
| 9,122,552 B2 | 9/2015 | Whitney | |
| 9,137,115 B2 | 9/2015 | Mayfield | |
| 9,239,857 B2 | 1/2016 | Trinon | |
| 9,323,801 B2 | 4/2016 | Morozov | |
| 9,363,252 B2 | 6/2016 | Mueller | |
| 9,412,084 B2 | 9/2016 | Kowalski | |
| 9,467,344 B2 | 10/2016 | Gere | |
| 9,535,737 B2 | 1/2017 | Joy | |
| 9,613,070 B2 | 4/2017 | Kumar | |
| 9,645,833 B2 | 5/2017 | Mueller | |
| 9,659,051 B2 | 5/2017 | Hutchins | |
| 9,792,387 B2 | 10/2017 | George | |
| 9,852,165 B2 | 12/2017 | Morozov | |
| 10,002,203 B2 | 6/2018 | George | |
| 2003/0084150 A1 * | 5/2003 | Hansen | H04L 41/0609 709/224 |
| 2011/0119374 A1 * | 5/2011 | Ruhl | G06Q 10/06 709/224 |

OTHER PUBLICATIONS

Extended European Search Report for European Patent Application No. 19165557.0 dated Jul. 10, 2019; 8 pgs.

* cited by examiner

ALERT MANAGEMENT SYSTEM AND METHOD OF USING ALERT CONTEXT-BASED ALERT RULES

BACKGROUND

The present disclosure relates generally to configuration management databases (CMDBs) and, more particularly, to managing alerts in CMDBs.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called software as a service (SaaS) and platform as a service (PaaS) technologies. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

Within the context of cloud computing solutions for CMDBs, users may be asked to deal with ever increasing amounts of data, e.g., with respect to the number of Configuration Items (CIs) stored in the CMDB (including such CIs' relevant metadata, such as manufacturer, vendor, location, etc.), as well as the alerts, service metrics, and maintenance status information related to such CIs. In fact, the amount of data collected and stored in today's cloud computing solutions, such as CMDBs, may be orders of magnitude greater than what was historically collected and stored. Users tasked with automating and/or troubleshooting enterprise, IT, and/or other organization-related functions (e.g., incident tracking and/or help desk-related functions) navigate ever increasing amounts of data to properly and efficiently perform their job functions. In particular, CMDBs may generate hundreds or thousands of alerts in a brief period of time, and users may want to define complex, automatic responses to these alerts. With this in mind, the following embodiments are directed to improving the manner in which alerts are managed within the CMDB, as well as the manner in which the user interfaces with the alert management system, in order to provide an enhanced user experience.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed toward a context-based alert management system for use in a CMDB platform. Present embodiments enable users to create and implement customized alert rules in which substantially all alert context is available throughout execution of the alert rules. For example, user can design an alert rule that references substantially any information relating to alerts, to configuration items (CIs) associated with alerts, events related to alerts, or any other suitable data stored by the client instance, which together comprise alert context. As such, the presently disclosed technique generally makes alert management more intuitive, flexible, structured, and process driven, and provides an improved interface for creating and visualizing alert rules.

In an example embodiment, a client instance that is associated with a CMDB platform includes database tables related to the disclosed alert management system. For example, the database tables may include an alert table, an alert rules table, and a configuration items (CI) table. The alert management system also includes an alert rules engine that is configured to execute the alert rules in the alert rule table against the alerts in the alert table. This may include applying one or more filters of an alert rule to the alert table, and then evaluating one or more conditions of the alert rule using the results of the one or more filters. When the one or more conditions are satisfied, the alert rules engine further executes one or more actions of the alert rule. Substantially all of the alert context is available and can be accessed by the alert rule during execution of any portion (e.g., filters, conditions, and actions) of the alert rule. For example, an alert rule may include filters, conditions, and actions that each reference the context of one or more alerts in the alert table. In certain embodiments, the alert rule include or reference alert field values, time conditions, CI conditions, escalation conditions, among others, as discussed herein.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
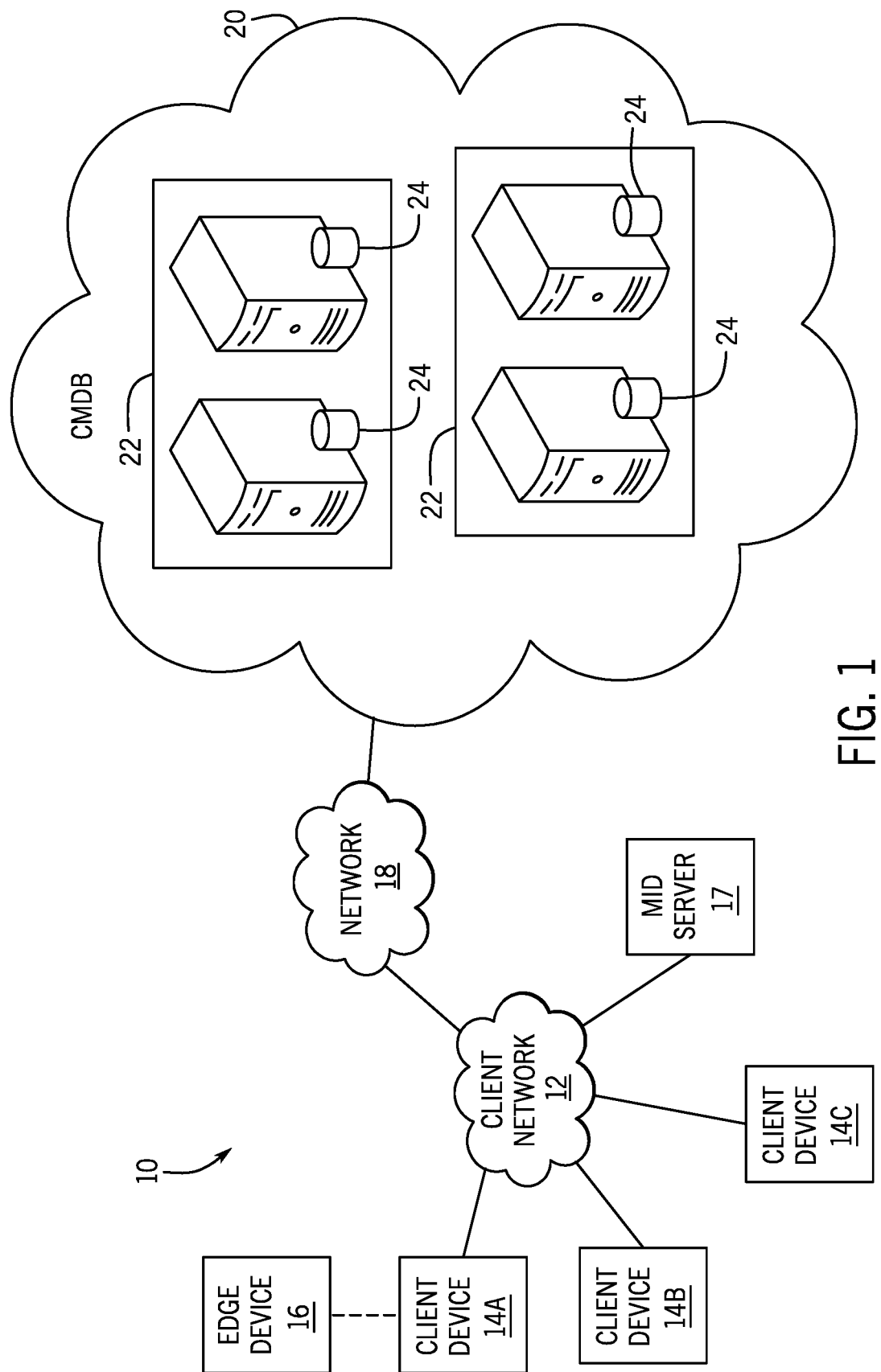
FIG. 1 is a block diagram of an embodiment of a cloud computing system in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to a single electronic computing device that includes, but is not limited to a single computer, virtual machine, virtual container, host, server, laptop, and/or mobile device, or to a plurality of electronic computing devices working together to perform the function described as being performed on or by the computing system. As used herein, the term "medium" refers to one or more non-transitory physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "configuration item" or "CI" refers to a record for any component (e.g., computer, device, piece of software, database table, script, webpage, piece of metadata, etc.) in an enterprise network, for which all relevant data, such as manufacturer, vendor, location, or similar data, is stored in a CMDB.

The term "context" as used herein with respect to an alert may include substantially any information stored in the CMDB that is related to the alert. For example, alert context may include all suitable fields of the alert, all CI fields for CIs associated with the alert, as well as any field of a related alert and any field of an event associated with the alert. By way of more specific example, the context of an alert may include a severity of the alert, a time of the alert, a CI that generated the alert, information regarding related CIs, relationships to other alerts, and so forth.

Present embodiments are directed toward a context-based alert management system for a CMDB. Present embodiments enable the creation and implementation of alert rules that can access substantially any alert context as variables during execution to provide customized alert management. As discussed, an alert rule may be generally described as a "if . . . then" conditional statement, wherein at least one associated action is executed when a defined set of filters and conditions are satisfied. The "if" portion of the alert rule can include any suitable number of filters and conditions that are combined to identify and evaluate alerts based on particular alert context. Additionally, since substantially all alert context is exposed and available during execution of the alert rules, this enables the design and implementation of complex and powerful alert rules based on any suitable aspect of the alert context. As such, the presently disclosed technique generally makes alert rules more intuitive, flexible, structured, and process driven, and provides an improved interface for creating and visualizing alert rules.

Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and CMDB platform 20. In one embodiment, the client network 12 may be a local private network, such as local area network (LAN) that includes a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the CMDB platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the CMDB platform 20. FIG. 1 also illustrates that the client network 12 includes a management, instrumentation, and discovery (MID) server 17 that facilitates communication of data between the network hosting the CMDB platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, in order to transfer data between the client devices 14A-C and the network hosting the CMDB platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), WiFi® networks (WIFI is a registered trademark owned by Wi-Fi Alliance Corporation), and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the CMDB platform 20 may be a remote network (e.g., a cloud network) that is able to communicate with the client devices 14A-C via the client network 12 and network 18. The network hosting the CMDB platform 20 provides additional computing resources to the client devices 14A-C and/or client network 12. For example, by utilizing the network hosting the CMDB platform 20, users of client devices 14A-C are able to build and execute applications, such as CMDBs or other automated processes for various enterprise, IT, and/or other organization-related functions, such as alert processing and handling. In one embodiment, the network hosting the CMDB platform 20 includes one or more data centers 22, where each data center could correspond to a different geographic location. Each of the data centers 22 includes a plurality of server instances 24 (also referred to herein as application instances or application server instances), where each server instance can be implemented on a physical computing system, such as a single electronic computing device (e.g., a single physical hardware server) or could be in the form a multi-computing device (e.g., multiple physical hardware servers). Examples of server instances 24 include, but are not limited to a web server instance (e.g., a unitary Apache installation), an application server instance (e.g., unitary Java® Virtual Machine), and/or a database server instance, e.g., a unitary MySQL® catalog (MySQL® is a registered trademark owned by MySQL AB A COMPANY).

To utilize computing resources within the CMDB platform 20, network operators may choose to configure the data centers 22 using a variety of computing infrastructures. In one embodiment, one or more of the data centers 22 are configured using a multi-tenant cloud architecture, such that one of the server instances 24 handles requests and serves multiple customers. In other words, data centers with multi-tenant cloud architecture commingle and store data from multiple customers, where multiple customer instances are assigned to one of the server instances 24. In a multi-tenant cloud architecture, the particular server instance of the server instances 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure to a particular one of the server instances 24 causing outages for all customers allocated to the particular server instance.

In another embodiment, one or more of the data centers 22 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance and/or other combinations of server instances 24, such as one or more dedicated web server instances, one or more dedicated application server instances, and one or more database server instances, for each customer instance. In a multi-instance cloud architecture, multiple customer instances could be installed on a single physical hardware server, where each customer instance is allocated certain portions of the physical server resources, such as computing memory, storage, and processing power. By doing so, each customer instance has its own unique software stack that provides the benefit of data isolation, relatively less downtime for customers to access the CMDB platform 20, and customer-driven upgrade schedules. An example of implementing a customer instance within a multi-instance cloud architecture will be discussed in more detail below with reference to FIG. 2.

Figure 2:
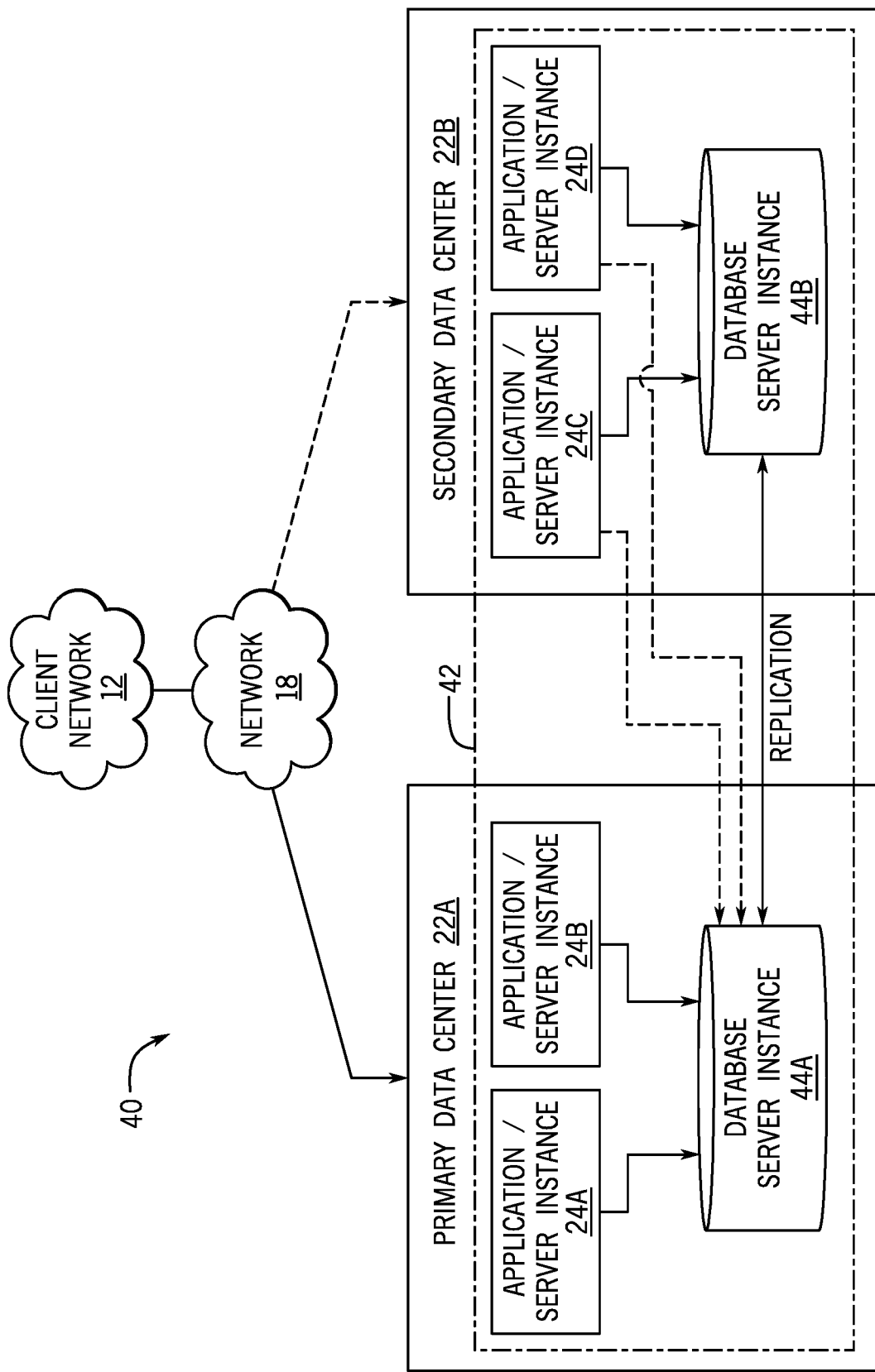
FIG. 2 is a block diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two data centers 22A and 22B. Data centers 22A and 22B can correspond to data centers 22 illustrated in FIG. 1 as located within the CMDB platform 20. Using FIG. 2 as an example, client instance 42 (also referred to as network environment and service provider cloud infrastructure client instance 42) is composed of four dedicated application server instances 24A, 24B, 24C, and 24D and two dedicated database server instances 44A and 44B. Stated another way, the application server instances 24A-24D and database server instances 44A and 44B are not shared with other client instances. Other embodiments of the multi-instance cloud architecture 40 could include other types of dedicated server instances, such as a web server instance. For example, the client instance 42 could include the four dedicated application server instances 24A-24D, two dedicated database server instances 44A and 44B, and four dedicated web server instances (not shown in FIG. 2).

To facilitate higher availability of the client instance 42, the application server instances 24A-24D and database server instances 44A and 44B are allocated to two different data centers 22A and 22B, where one of the data centers 22 acts as a backup data center. In reference to FIG. 2, data center 22A acts as a primary data center 22A that includes a primary pair of application server instances 24A and 24B and the primary database server instance 44A for the client instance 42, and data center 22B acts as a secondary data center 22B to back up the primary data center 22A for the client instance 42. To back up the primary data center 22A for the client instance 42, the secondary data center 22 includes a secondary pair of application server instances 24C and 24D and a secondary database server instance 44B. The primary database server instance 44A is able to replicate data to the secondary database server instance 44B.

As shown in FIG. 2, the primary database server instance 44A may replicate data to the secondary database server instance 44B using, e.g., a Master-Master MySQL Binlog replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the application server instances 24A and 24B and/or primary data server instance 44A fails and/or is under maintenance, data traffic for client instances 42 can be diverted to the secondary application server instances 24C and the secondary database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the CMDB platform 20 is implemented using data centers, other embodiments of the of the CMDB platform 20 are not limited to data centers and can utilize other types of remote network infrastructures. Moreover, other embodiments of the present disclosure may combine one or more different server instance into a single server instance. Using FIG. 2 as an example, the application server instances 24A-D and database server instances 44A and 44B may be combined into a single server instance. The use and discussion of FIGS. 1 and 2 are only examples to facilitate ease of description and explanation and are not intended to limit the disclosure to the specific examples illustrated therein.

Figure 3:
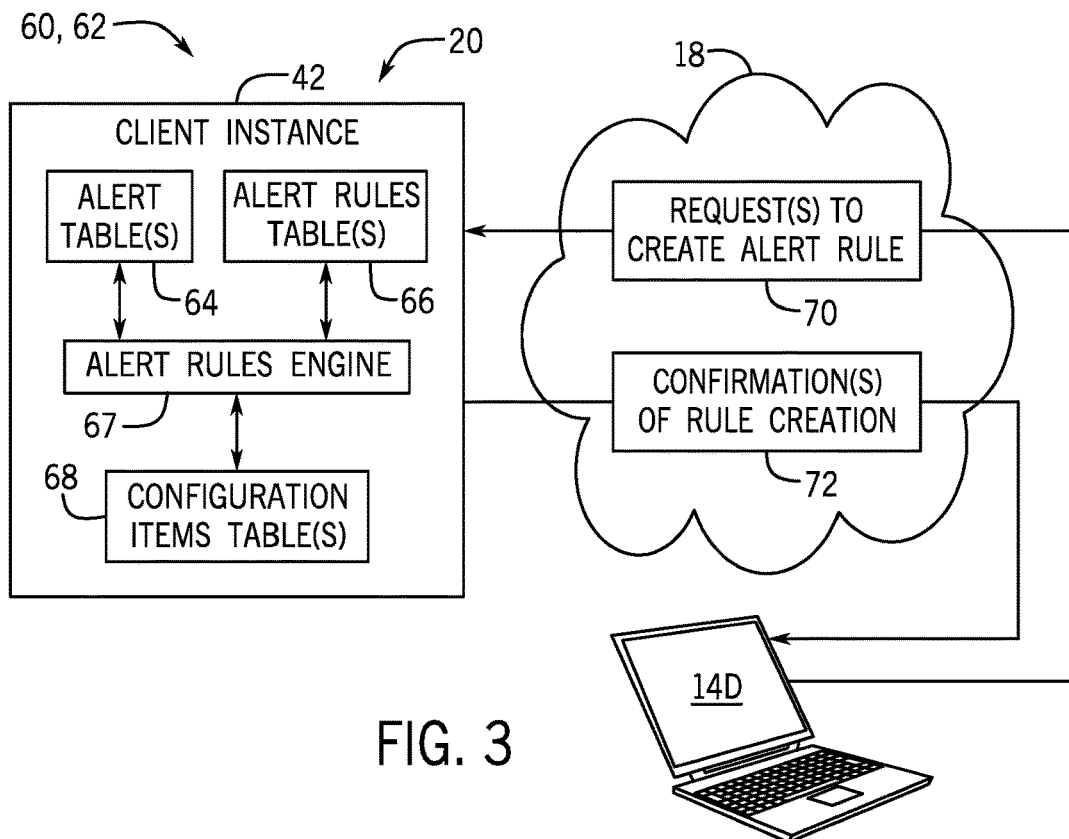
FIG. 3 is a block diagram of an alert management system that is associated with a CMDB platform, in accordance with embodiments of the present technique.

As mentioned, present embodiments are directed to a CMDB alert management system, such as the alert management system 60 illustrated in FIG. 3. More specifically, FIG. 3 is a block diagram 62 illustrating an embodiment a client instance 42 that may be used to support the improved alert management system 60, according to one or more disclosed embodiments. Block diagram 62 illustrates an example of a portion of a service provider cloud infrastructure, including the CMDB platform 20 discussed above. The CMDB platform 20 is connected to a client device 14D via the network 18 to provide a user interface to network applications executing within the client instance 42 (e.g., via a web browser of the client device 14D). Client instance 42 illustrates cloud resources and server instances similar to those explained with respect to FIG. 2, and is illustrated here to show support for an alert management capability within the client instance 42. Cloud provider infrastructures are generally configured to support a plurality of end-user devices, such as client device 14D, concurrently, wherein each end-user device is in communication with the single client instance 42. Also, cloud provider infrastructures may be configured to support any number of client instances, such as client instance 42, concurrently, with each of the instances in communication with one or more end-user devices. As mentioned above, an end-user may also interface with client instance 42 using an application that is executed within a web browser.

For the embodiment of the alert management system 60 illustrated in FIG. 3, the client instance 42 includes (e.g., hosts, stores) one or more alert tables 64 and one or more alert rules tables 66 that respectively store alerts and alert rules related to the operation of a CMDB platform 20. The illustrated client instance 42 also includes an alert rule engine 67, which may be an application including instructions that execute (e.g., continuously, periodically) the alert rules stored in the alert rules tables 66 against alerts stored in the alert tables 64. The alert tables 64 generally include any suitable number of fields that store information related to alerts generated by the CMDB platform 20 during operation. For example, the alert tables 64 may include information related to a source of the alert (e.g., software that generated the alert), an IP address of the device that generated the alert, a type of the alert event (e.g., "high CPU temperature"), a CI that generated the alert, a severity of the alert (e.g., "critical", "major", "minor"), a state of the alert (e.g., "open", "flapping", "clear"), whether or not the alert has been acknowledged, and so forth. In certain embodiments, a CI field of at least one of the alert tables 64 may store a value (e.g., a JSON string) that uniquely identifies a particular CI in one or more CI tables 68 that are also associated with the client instance 42. The CI tables 68 generally include any suitable number of fields that store information related to CIs associated with the client instance 42. As such, the context of an alert includes information included in the alert tables 64, CI tables 68, and/or any other suitable table associated with the client instance 42 or the CMDB platform 20, related to or associated with the particular alert. As discussed, the substantially all of the context of an alert (e.g., relevant information regarding the alert, the CI generating the alert, related alerts, and related CIs) is available throughout execution of the alert rules stored in the alert rules tables 66.

Additionally, as illustrated in FIG. 3, a client device 14D can communicate with the client instance 42 via the network 18. As discussed in greater detail below, the client device 14D can send one or more requests 70 to the client instance 42 to request creation of a new alert rule via the network 18. The requests 70 include information that is used to populate particular fields of the alert rules tables 64 to define the new alert rule, as discussed below. Additionally, in certain embodiments, the client instance 42 may provide, to the client device 14D, information regarding particular fields or particular values of fields that can be used to populate user interface mechanisms (e.g., drop-down lists) to assist the user in creating the alert rule, as discussed below. Further, for the embodiment illustrated in FIG. 3, the client instance 42 returns one or more confirmations 72 via the network 18, indicating successful creation of the new alert rule in the alert rules tables 64.

Figure 4:
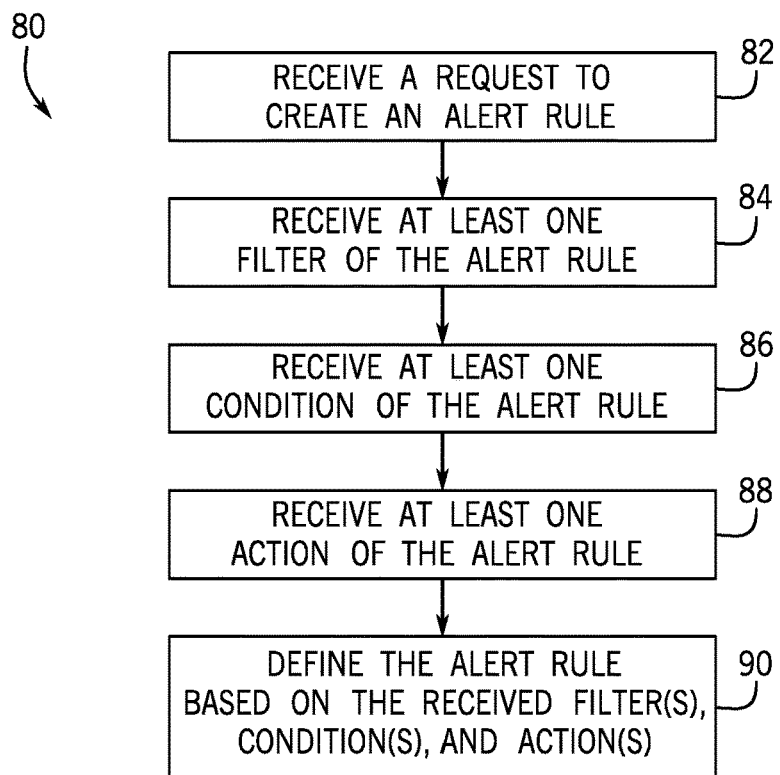
FIG. 4 is a flow diagram of a process for creating an alert rule, in accordance with embodiments of the present technique.

FIG. 4 is a flow diagram illustrating an example embodiment of a process 80 whereby the client instance 42 creates a new alert rule based on input from the client device 14D. As such, the process 80 may be stored in one or more suitable memories or media and executed by one or more suitable processors associated with the client instance 42. It may be appreciated that steps of the example process 80 may be performed in other orders, skipped, or repeated, in other embodiments. The illustrated process 80 begins with the client instance 42 receiving (block 82) a request 70 to create the new alert rule from the client device 14D. In certain embodiments, the request 70 may be a single request that includes at least a minimum amount of data to define the new alert rule in the alert tables 64. In other embodiments, the client instance 42 may receive a sequence of requests 70 that include the data to define the new alert rule.

As such, the client instance 42 receives (block 84) at least one filter of the new alert rule from the client device 14D. The client instance 42 also receives (block 86) at least one condition of the new alert rule from the client device 14D. Additionally, the client instance 42 receives (block 88) at least one action of the new alert rule. Then, the client instance 42 defines (block 90) a new row or entry in the one or more alert rules tables 66 based on the received one or more filters, conditions, and actions received in the proceeding steps. The alert context-based filters, conditions, and actions of the disclosed alert rules are discussed in greater detail below.

As mentioned, the disclosed alert management system 60 enables the creation and execution of complex alert context-based rules. More specifically, the disclosed system enables an authorized user to create an alert rule according to the general pattern, "If alert A (defined filter 1) (and or) alert B (defined filter 2) . . . and if (defined condition 1) (and or) (defined condition 2) . . . . Then Do (defined action 1) (and or) (defined action 2) . . . ." As such, an alert rule may be generally described as an "If . . . then" statement that having an "if" portion including one or more filters and one or more conditions, and having a "then" portion including one or more actions (e.g., action 1, action 2) that are executed when the "if" portion of the statement is satisfied (e.g., evaluated as true). The "if" portion of the alert rule may contain any suitable Boolean combination of alert filters and alert conditions based on any suitable alert context, such as alerts having a severity of critical, alerts occurring on weekends, or recurrent alerts having a frequency greater than a predetermined threshold value. Since the entire context of each the alerts is exposed and available throughout execution of the alert rule (e.g., filters, conditions, and actions) this enables the construction of complex alert rules, as discussed.

As mentioned, the disclosed alert rule includes an "if" portion having any suitable number of alert filters and alert conditions, each specifying criteria for alerts based on alert context, wherein the output of each of the alert filters and alert conditions may be combined via an AND or an OR Boolean operator. In certain embodiments, a filter may specify an alert field or attribute (e.g., alert severity, alert class, alert condition, alert time) as having a value that is equal to a particular value, as well as greater than/less than a particular value (e.g., minimum/maximum threshold values) for numeric alert attributes.

In certain embodiments, a filter may be based on the alert source and include any suitable attribute of the CI that generated the alert (e.g., a class of the CI, a location of the CI). For example, a filter may specify alerts that are generated by the same CI or by related CIs in the CMDB platform 20. In certain embodiments, a filter may specify any query condition of the CMDB, such as the presence of a particular record in a particular table of the CMDB. For example, a filter may include a query to any suitable alert related table of the CMDB, such as an impact services table, a groups table, an events table, or another table storing related incidents (INT), changes (CHG), or problems (PRB) related to alerts in the CMDB. In certain embodiments, a filter may specify alerts that are primary, alerts that are secondary, or alerts that are neither.

In certain embodiments, one or more of the filters may be based on a time component and/or a frequency component of the alerts. For example, a filter may specify alerts generated during a particular calendar setting (e.g., work day, weekend, holiday). In certain embodiments, a filter may specify limitations regarding the respective alert history of each of the alerts. For example, the filter may indicate that if alert A is repeated more than a predetermined number of times, then do perform a particular action. In certain embodiments, a filter may specify alerts or other events having a particular frequency (e.g., once per hour, once per day). For example, to implement an escalation strategy, a filter may specify an alert that is present in an alert queue more than a predetermined number of times and that has not been acknowledged more than a second predetermined number of times.

As mentioned, an alert rule may also include one or more alert conditions that are also based on alert context. In general, alert filters generally filter (e.g., identify, select) alerts based on alert context, while alert conditions determine whether the "if" portion of the alert rule is satisfied by the filtered alert(s). For example, when an alert rule only includes a single filter, then the alert condition may compare the context of the filtered alert to particular values to determine whether the "if" portion of the alert rule is satisfied. When multiple alert filters are used, alert rule conditions may compare the alert context of a first alert (filtered by filter A) to the alert context of a second alert (filtered by filter B) to determine whether the "if" portion of the alert rule is satisfied.

For example, within an alert rule, a first filter defines alert A, and a second filter defines alert B, and an alert condition may then compare particular context of the first alert to particular context of the second alert to determine whether or not the "if" portion of the alert rule is satisfied. By way of specific example, an alert rule condition may specify that if alert A has the same alert type as alert B, or if alert A has higher severity than alert B, then perform a particular action. In certain embodiments, an alert rule condition may include a time component with respect to multiple alerts. For example, a condition of an alert rule may specify that an action be taken if alert A (defined by filter A) has a timestamp that is within a threshold time window (e.g., within 2 hours of) alert B (defined by filter B). In certain embodiments, an alert rule condition may specify relationships between the filtered alerts. For example, an alert rule condition may specify an action be performed if an alert A is a child of alert B, or if alert B is a parent of alert A.

As mentioned, an alert rule includes one or more actions that are executed when the "if" portion of the alert rule is determined to be true. Additionally, as mentioned, substantially all fields associated with the alerts and CIs of the CMDB platform 20 are available for use during the execution of the actions of an alert rule, enabling sophisticated, customized responses to manage alerts. In certain cases, the alert rule actions may be relatively simple. For example, an action may include acknowledging or closing one or more alerts. In certain embodiments, the actions may include adjusting an attribute associated with one or more alerts. For example, an alert rule action can involve changing, modifying, or overriding information regarding alert severity, acknowledgement, maintenance, or any other suitable alert information. Alert rule actions may also include associating a knowledge base document or assigning an alert template with one or more alerts. Additionally, in certain embodiments, the actions of an alert rule may include defined delays (e.g., wait a predetermined number of seconds before executing), as well as define escalating actions (e.g., for recurring or unacknowledged alerts).

In certain embodiments, the alert rule actions include actions that define (e.g., create, modify) relationships between alerts. For example, in certain embodiments, alert rule actions may include adding one or more alerts to an alert group. By way of specific example, a hierarchy alert group includes a primary alert that is associated with any suitable number of secondary alerts. A peer-to-peer alert group may include a master alert as the primary alert of the group, or enable a user-defined primary alert, wherein closing the primary alert removes/closes the entire group. With this in mind, the presently disclosed alert rule actions can create and define new primary alerts for hierarchy alert groups, as well as modify the role (e.g., primary, secondary) of one or more alerts. Additionally, an alert rule action may add one or more alerts to, or remove one or more alerts from, a group, as well as define new alert groups.

In certain embodiments, the one or more alert rule actions of an alert rule include external alert rule actions. As used herein, "external" refers to actions of the client instance that are outside of the alert portion of the system. In certain embodiments, these external actions include launching one or more application(s), such as an interactive user interface or launcher. The external actions may include running one or more remediations, which may be interactive or may execute in the background. In certain embodiments, the external action can include opening a new incident (INT), change (CHG), or problem (PRB) in the CMDB, immediately or with a predetermined delay. The external action may include conditionally updating an existing INT/CHG/PRB, such as assigning it to a group. For example, the external actions may include escalating, merging, or conditionally auto-closing INTs/CHGs/PRBs based on alert context. External actions may also include sending an email, creating an alert task, executing a script or workflow, updating a service level agreement (SLA), creating outage records, or running a discovery operation (e.g., horizontal, top down). In certain embodiments, external actions include changing a service status, opening a chat dialog in a messaging tool, and updating CI attributes. External actions may also include making Hypertext Transfer Protocol (HTTP) or Hypertext Transfer Protocol Secure (HTTPS) calls that are not associated with the GUI, as well as updating data source (e.g., update system center operation manager (SCOM) with a parameter from the alert).

As such, the disclosed design enables the design of complex alert rules. For example, the present technique enables the creation of alert rules that define whether to execute an action once (e.g., only on new alert, or on updated alerts) or every time the alert is generated until a certain threshold (e.g. run remediation only 3 times). Additionally, the present technique enables the creation of an alert rule that indicates, for example, if a secondary alert is added to a primary alert, then update the related INTs, and if the primary alert is not group membered, and an INT is opened and the alert becomes a secondary alert, merge the INTs together. By way of further example, the disclosed alert rules enable an INT to be updated (e.g., change description, priority, or assignment group), in response to a change in severity of an alert.

In certain embodiments, a single alert rule can be a combination of multiple "if . . . then" statements. For example, a single alert rule may specify, "If alert.field1 is X, then perform action A, and if alert.field2 is Y, then perform action B." As such, for this example, action A and/or B may be performed based on the values of the indicated alert fields. In another example, an alert rule may dictate that if a particular CI generated an alert, then a first INT is opened, and if the particular CI generated the alert and the alert has a severity of critical, then an second INT is opened and a notification is generated. In certain cases, the first and second INTs may be the same, while in other cases, the first and the second incidents may have a different category, a different assignment group, a different service level agreement (SLA).

Below are examples of alert rules, in accordance with present embodiments. In certain cases, an alert rule may be relatively simple. For example, an example alert rule may indicate, "If alert.source is X then open incident." Accordingly, a new incident is opened if an alert can be located indicating that X is the alert source. In another example, an alert rule may indicate, "If alert.type is X and if alert.description contains Y, and alert.severity is critical, then open incident, send email, and mark alert as acknowledged." As such, only if an alert can be located having the specified alert type, description, and severity will an incident be opened, an email sent, and the alert marked as acknowledged. Another example alert rule may indicate, "If alert.type is X, and if alert.description contains Y, and alert.time is in 'working hours', then open incident (different assignment group), send email, and mark alert as acknowledged." Accordingly, only if an alert can be located having the specified alert type, description, and calendar setting will an incident be opened that is assigned to a different group relative to the alert, an email sent, and the alert marked as acknowledged.

In certain cases, an alert rule may be more complex. For example, an alert rule may indicate, "If alert.type is X, and alert.description contains Y, and alert.severity is critical, and CI is member in 'Service ABC', then open incident (different INT category, assignment group), send email, and mark alert as acknowledged." For this example, only if an alert can be located having the specified alert type, description, severity, and that is generated by a CI that is a member of the specified service, will an incident will be opened in a different INT category and assigned to a different group relative to the alert, an email sent, and the alert marked as acknowledged. By way of further example, an alert rule may indicate, "If alert.severity is higher than major, and service.priority is critical, then open a major INT." For this example, if an alert can be located having a severity that is above major and that is associated with a service having a critical priority, then a major incident is opened. In another example, an alert rule may indicate, "If count (alert.secondaries) is higher than 10, then increase alert.severity." For this example, if an alert can be located having a secondary alert count greater than 10, then the severity of the alert is increased.

In certain cases, an alert rule may involve or define relationships between alerts. For example, an alert rule may indicate, "If alert.a.type is processor, and alert.b.type is memory, and alert.a.CI is the same as alert.b.CI, then set alert.a as parent and alert.b as child." In this example, if a first alert (alert.a) can be located having the specified type, and a second alert (alert.b) can be located having the specified type, and both of the alerts are generated by the same CI, then set the first alert as the parent of the second alert. In another example, an alert rule may indicate, "If alert.a.severity is critical, and alert.b.severity is the same as alert.a.severity, and alert.a.CI is the same as alert.b.CI, and alert.a.createdtime diff from alert.b.createdtime by 120 sec or less, then set alert.a as parent and alert.b as child." In this example, if a first alert (alert.a) and a second alert (alert.b) both have a severity of critical, are generated by the same CI, and are generated within two minutes of one another, then the first alert is set as the parent of the second alert.

In yet another example, an alert rule may indicate, "If alert.a.severity is critical and alert.b.severity is the same as alert.a.severity and alert.a.CI runs on alert.b.CI and alert.a.createdtime diff from alert.b.createdtime by 120 sec, then set alert.a as parent and alert.b as child." For this example, if a first alert (alert.a) and a second alert (alert.b) both have a severity of critical, are generated within two minutes of one another, and the CI that generated the first alert runs on (e.g., is hosted by) the CI that generated the second alert, then the first alert is set as the parent of the second alert. In still another example, an alert rule may indicate, "If alert.a.severity is critical, and alert.b.severity is the same as alert.a.severity, and alert.a.CI runs on alert.b.CI and alert.a.createdtime diff from alert.b.createdtime by 120 sec, then create alert.c (new) set alert.c as parent and alert.a and alert.b as child." For this example, if a first alert (alert.a) and a second alert (alert.b) both have a severity of critical, are generated less than two minutes of one another, and the CI that generated the first alert runs on (e.g., is hosted by) the CI that generated the second alert, then create a new alert (alert.c) and make the first and second alerts children of the new alert.

Additionally, as mentioned, alert rules can be created to define how alerts may be escalated. For example, an alert rule may indicate, "If alert is opened and not acknowledge more than X min and alert.a.CI is member in service A, then send email." For this example, if an open alert can be locate that has not been acknowledged in more than X minutes, wherein the CI that generated the alert is a member of the indicated service, then an email is sent.

FIGS. 5-11 are simulated screenshots illustrating an embodiment of a graphical user interface (GUI) that enables a user to define alert rules for a CMDB. While FIGS. 5-11 illustrate example layouts and user input mechanism, it may be appreciated that, in other embodiments, other layouts and/or user input mechanisms may be used, in accordance with the present disclosure.

Figure 5:
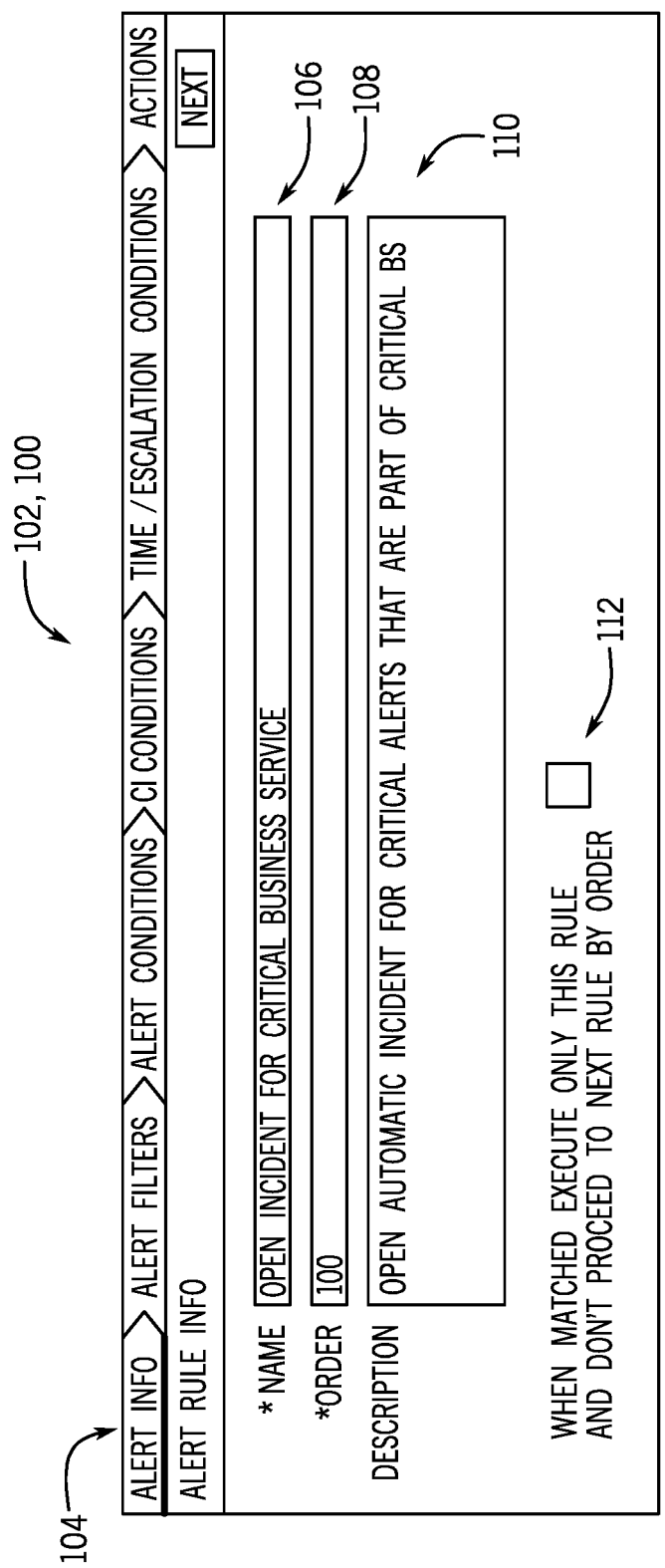
FIGS. 5, 6A, 6B, 7, 8A, 8B, 9, 10, and 11 are simulated screenshots of a graphical user interface (GUI) that enables a user to create an alert rule, in accordance with embodiments of the present technique.

FIG. 5 illustrates a first screen 102 of an embodiment of an alert rule creation GUI 100. The alert rule creation GUI 100 includes a plurality of tabs that enable the user to move to different portions of the alert rule creation process. In FIG. 5, an "Alert info" tab 104 is selected, and as such, this corresponds to the illustrated first screen 102 of the GUI 100. The illustrated first screen 102 includes a number of fields that can be populated by the user to define fields of a new alert rule. In particular, the illustrated first screen 102 includes an alert rule name field 106, an alert rule order field 108, and an alert rule description field 110. The name field 106 and the description field 110 may accept strings of characters of suitable length, while the order field 108 may stipulate a positive integer value. Additionally, in certain embodiments, the first screen 102 may include a user input mechanism 112 (e.g., a checkbox or radio button) that, when selected, indicates that when the new alert rule is matched to one or more alerts, then only the new alert rule should be executed, and not any subsequent rules (e.g., based on the value of the order field 108).

Figure 6A:
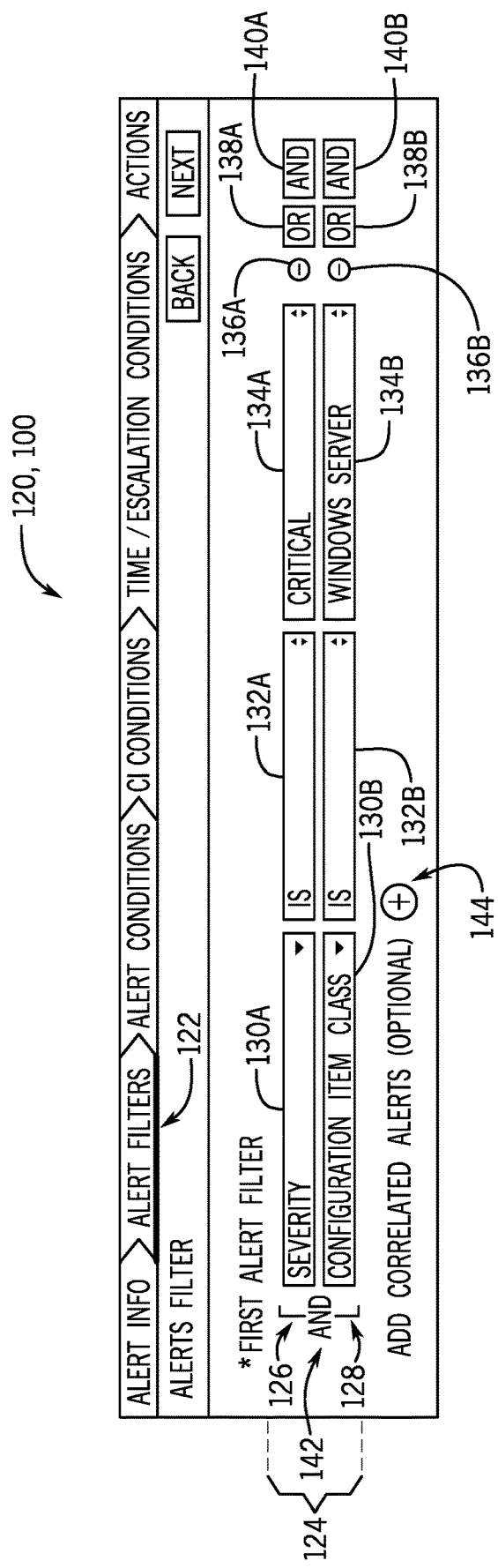

FIG. 6A illustrates a second screen 120 of the embodiment of the alert rule creation GUI 100, wherein an "Alert filter" tab 122 is selected. As such, using the second screen 120, the user can define one or more alert filters for the new alert rule. The illustrated second screen 120 includes a first set of user input mechanisms 124 that enable the user to define a first filter of an alert rule. The first set of user input mechanisms 124 include a first row 126 having drop-down lists that are used to define a first subcondition of the first filter and a second row 128 having drop-down lists that are used to define a second subcondition of the first filter. The first row 126 includes a first drop-down list 130A that enables the user to select a particular piece of alert context for the alert filter (e.g., a field of the alert or CI), a second drop-down list 132A that enables the user to select a particular comparison (e.g., "is", "is not", "greater than", "less than"), and a third drop down list 134A that enables the user to select a value. Additionally, the third drop down list 134A may be populated with values based on the user's selection in the first drop-down list 132A. For example, when the user selects alert severity from the first drop-down list 132A, the third drop-down list 134A may be populated with different severity values (e.g., "critical", "major", "minor", "warning", "info", "clear"). By way of further example, when the user selects alert state from the first drop-down list 132A, the third drop-down list 134A may be populated with different state values (e.g., "open", "reopen", "flapping", "closed") from which the user can select a suitable value.

For the illustrated embodiment, the first row 126 includes user input mechanisms for combining different subconditions to define the first filter of the new alert rule. These include a remove subcondition button 136A, an "OR" button 138A, and an "AND" button 140A. In response to receiving a selection of the "OR" button 138A or the "AND" button 140A, the second row 128 is presented as part of the first set of user input mechanisms 124 to enable the user to define a second subcondition of the first filter. In the illustrated example, the second subcondition was initiated using the "AND" button 140A, resulting in the "AND" indicator 142 positioned between the first row 126 and second row 128 of the first set of user input mechanisms 124. The second row 128 includes a respective first drop-down list 130B, second drop-down list 132B, third drop-down list 134B, remove subcondition button 136B, "OR" button 138B, and "AND" button 140B, which function as described above for the user input mechanisms of the first row 126. In response to receiving a user selection of the remove subcondition button 136A, the second row 128 may be removed from the second screen 120. In other embodiments, other features may be included on the second screen 120, including options to define the alert rule using a character string in lieu of the illustrated drop-down lists. Accordingly, the second screen 120 generally enables the user to define and combine any suitable number of subconditions to define the first filter of the alert rule.

Figure 6B:
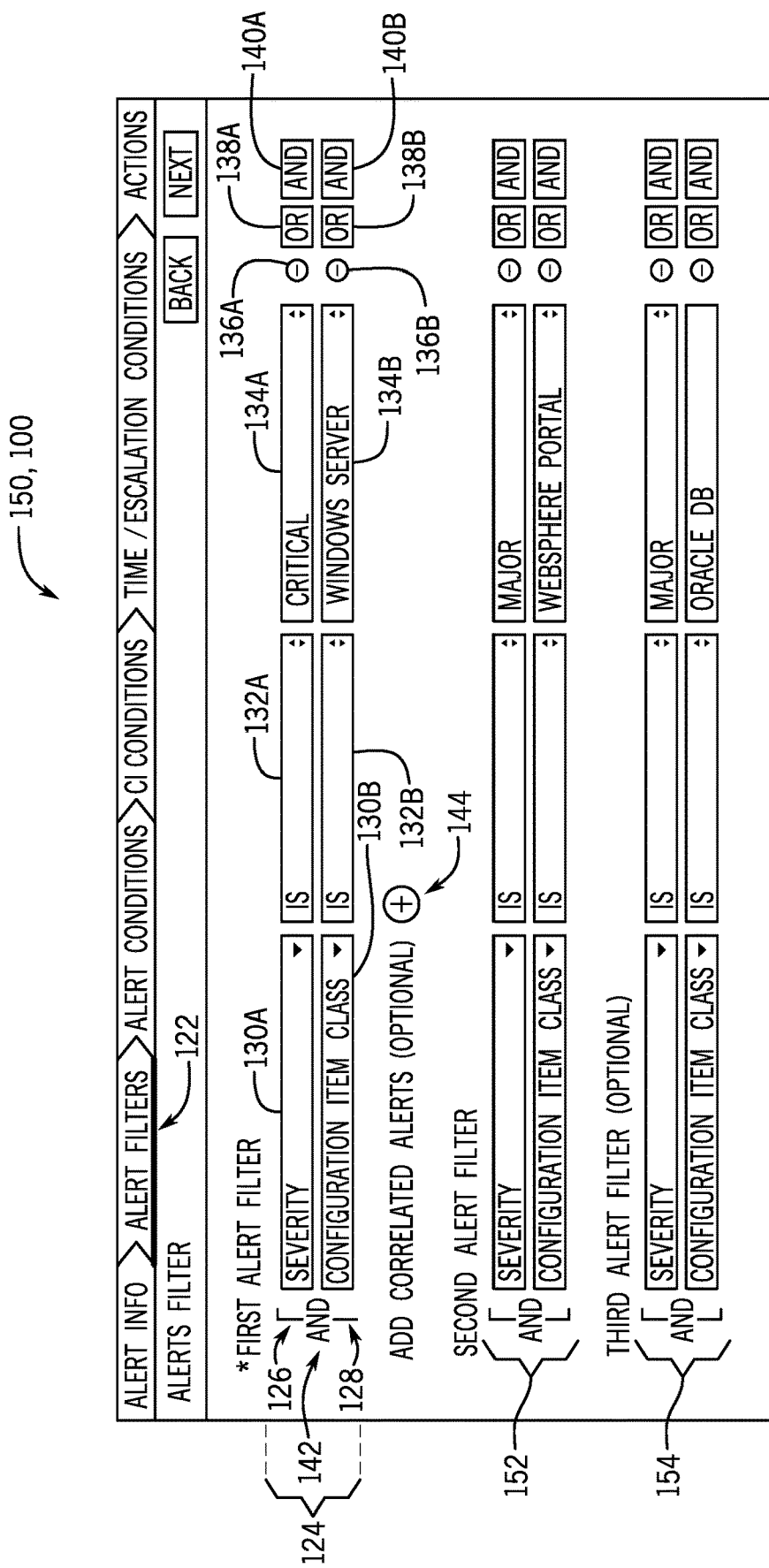

Additionally, the illustrated second screen 120 also includes an add correlated alerts button 144 that enables the user to define and combine multiple filters when creating the alert rule. For example, in response to receiving a user selection of the add correlated alerts button 144, the user may be presented with an updated second screen 150, as illustrated in FIG. 6B. The updated second screen 150 includes a second set of user input mechanisms 152 that enable the user to define a second filter of the alert rule, as well as a third set of user input mechanisms 154 to define a third filter of the alert rule. The second and third sets of user input mechanisms 152 and 154 function substantially similar to the first set of user input mechanisms 124 described above. It may be appreciated that, for the illustrated embodiment, the first filter (defined by the first set of user input mechanisms 124), the second filter (defined by the second set of user input mechanisms 152), and the third filter (defined by the third set of user input mechanisms 154) are combined together using a Boolean "AND" operator, such that each of the filters return an alert in order for the corresponding alert rule action to be performed.

Figure 7:
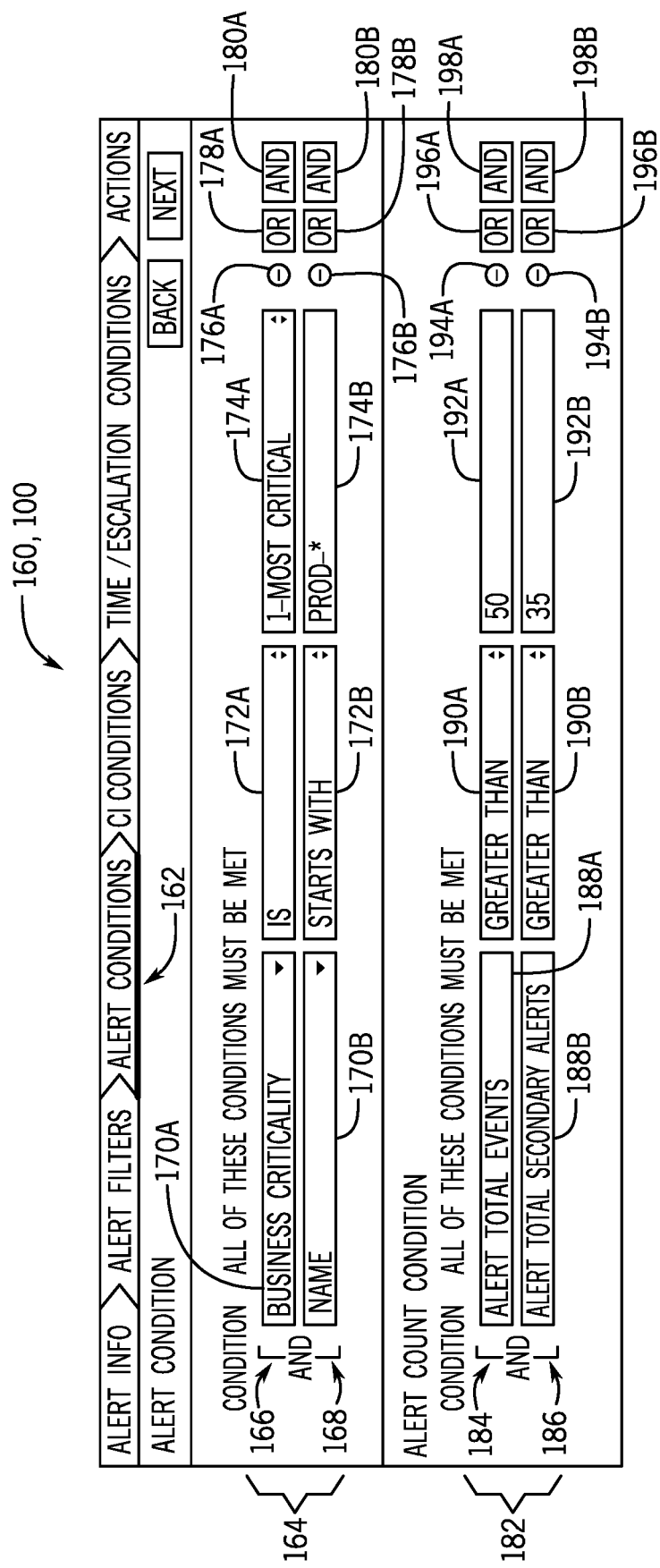

FIG. 7 illustrates a third screen 160 of the embodiment of the alert rule creation GUI 100, wherein an "Alert Conditions" tab 162 is selected. As such, using the third screen 160, a user can define one or more alert conditions for the new alert rule. The illustrated third screen 160 includes a first set of user input mechanisms 164 that enable the user to define a first alert condition of an alert rule. The first set of user input mechanisms 164 include a first row 166 having drop-down lists that are used to define a first subcondition of the first alert condition, and a second row 168 having drop-down lists that are used to define a second subcondition of the first alert condition. The first and second rows 166 and 168 include first drop-down lists 170A and 170B, second drop-down lists 172A and 172B, and third drop down lists 174A and 174B, remove subcondition buttons 176A and 176B, "OR" buttons 178A and 178B, and "AND" buttons 180A and 180B, respectively.

When a single filter is defined for the alert rule (e.g., in FIGS. 6A and 6B), the first drop-down lists 170A and 170B of the third screen 160 may be populated using pieces of alert context, similar to the first drop-down lists 130A and 130B of the second screens 120 and 150, as discussed above with respect to FIGS. 6A and 6B. However, it may be appreciated that, when two filters are defined for the alert rule (e.g., in FIGS. 6A and 6B), the first drop-down lists 170A and 170B of the third screen 160 may be populated with pieces of alert context that specify whether the subcondition is with respect to the first filtered alert, the second filtered alert, or all filtered alerts. For example, the alert rule includes only one filter, the first drop-down lists 170A and 170B may include "alert type" as a selectable option. In contrast, when the alert rule includes two or more filters, then the first drop-down lists 170A or 170B may include "first alert type", "second alert type", and "all alert type" as selectable options.

The illustrated third screen 160 includes a second set of user input mechanisms 182 that enable the user to define a count condition of an alert rule. The second set of user input mechanisms 182 includes a first row 184 and a second row 186 of input mechanisms. The first row 184 and the second row 186 include respective first drop-down lists 188A and 188B that include options involving total occurrences of filtered alerts. For example, when the alert rule includes only one filter, then the first drop down lists 188A and 188B may be populated with selectable options, such as a total number of primary events, or a total number of secondary events, returned by the sole filter. By way of further example, when the alert rule includes two filters, one defining alert A and another defining alert B, then the first drop-down list 188A may be populated with selectable options, including "alert A total events", "alert B total events", and "all alerts total events". Second drop-down lists 190A and 190B of the first and second rows 184 and 186, respectively, include options similar to the second drop down list 132A discussed above. Third text boxes 192A and 192B of the first and second rows 184 and 186, respectively, enable entry of positive integer values. Additionally, row 186 and 186 include respective remove subcondition buttons 194A and 194B, "OR" buttons 196A and 196B, and "AND" buttons 198A and 198B, which generally function as discussed above for adding and removing additional subconditions to the count condition of the alert rule.

Figure 8A:
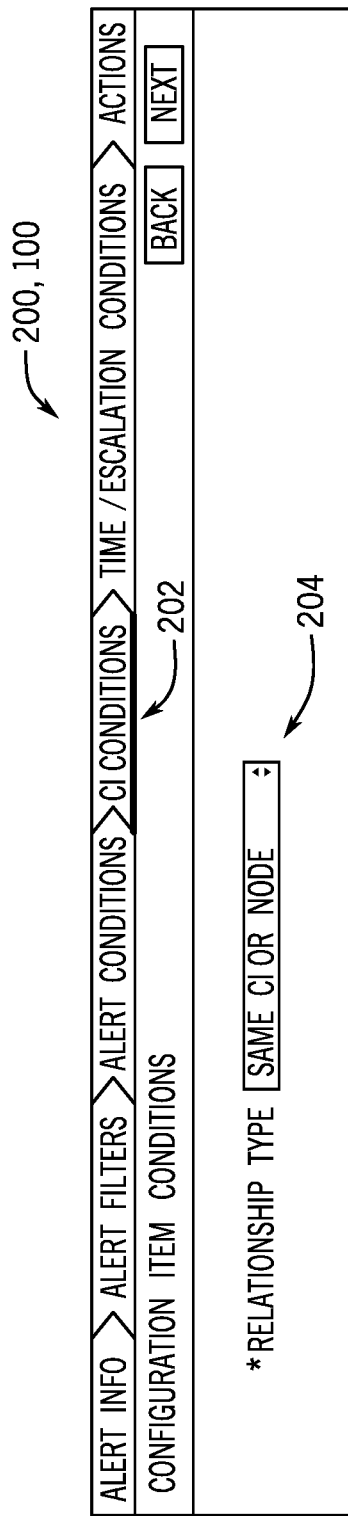
Figure 8B:
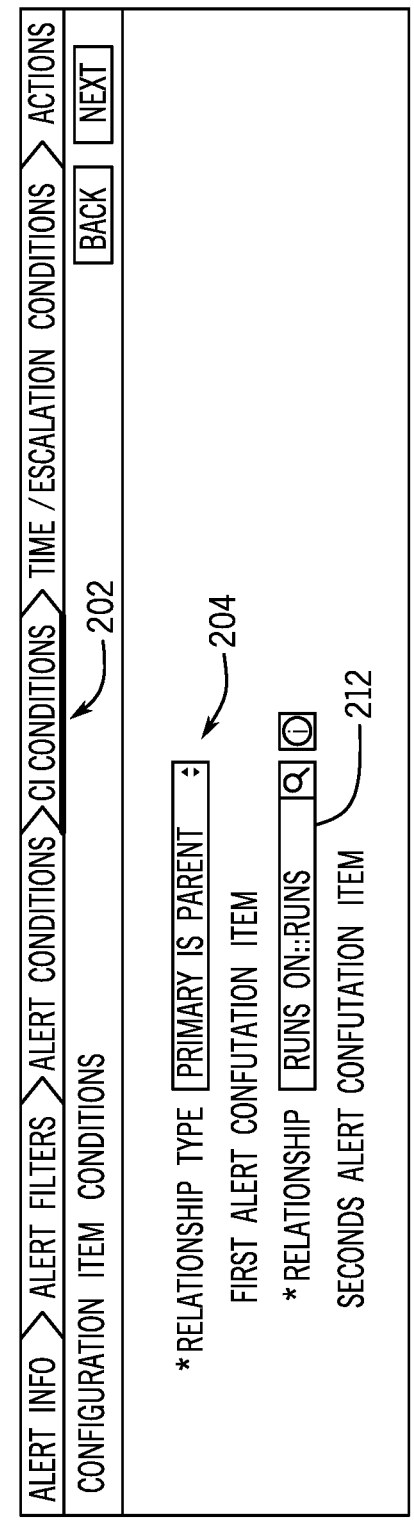

FIG. 8A illustrates a fourth screen 200 of the embodiment of the alert rule creation GUI 100, wherein a "CI Conditions" tab 202 is selected. It may be noted that the fourth screen 200 may only be presented or assessable when the alert rule includes two filters (e.g., filter 1 that defines alert A, and filter 2 that defines alert B). The illustrated fourth screen 200 includes a first drop-down list 204 that enables the user to select a particular relationship between alert A and alert B. For example, the first drop-down list 204 includes selectable options, such as "same CI or node", and "primary is parent." In particular, as illustrated in FIG. 8B, when "primary is parent" is selected, then an updated or alternative fourth screen 210 is presented, which includes a relationship text box 212 designed to receive user input to more specifically define the relationship. For the illustrated example in FIG. 8B, the relationship is indicates as a "Runs on::Runs" relationship between the CI that generated alert A and the CI that generated alert B. It may be appreciated that, for embodiments that include more than two filters, additional fields may be present on the updated fourth screen 210 to define additional relationships between filtered alerts.

Figure 9:
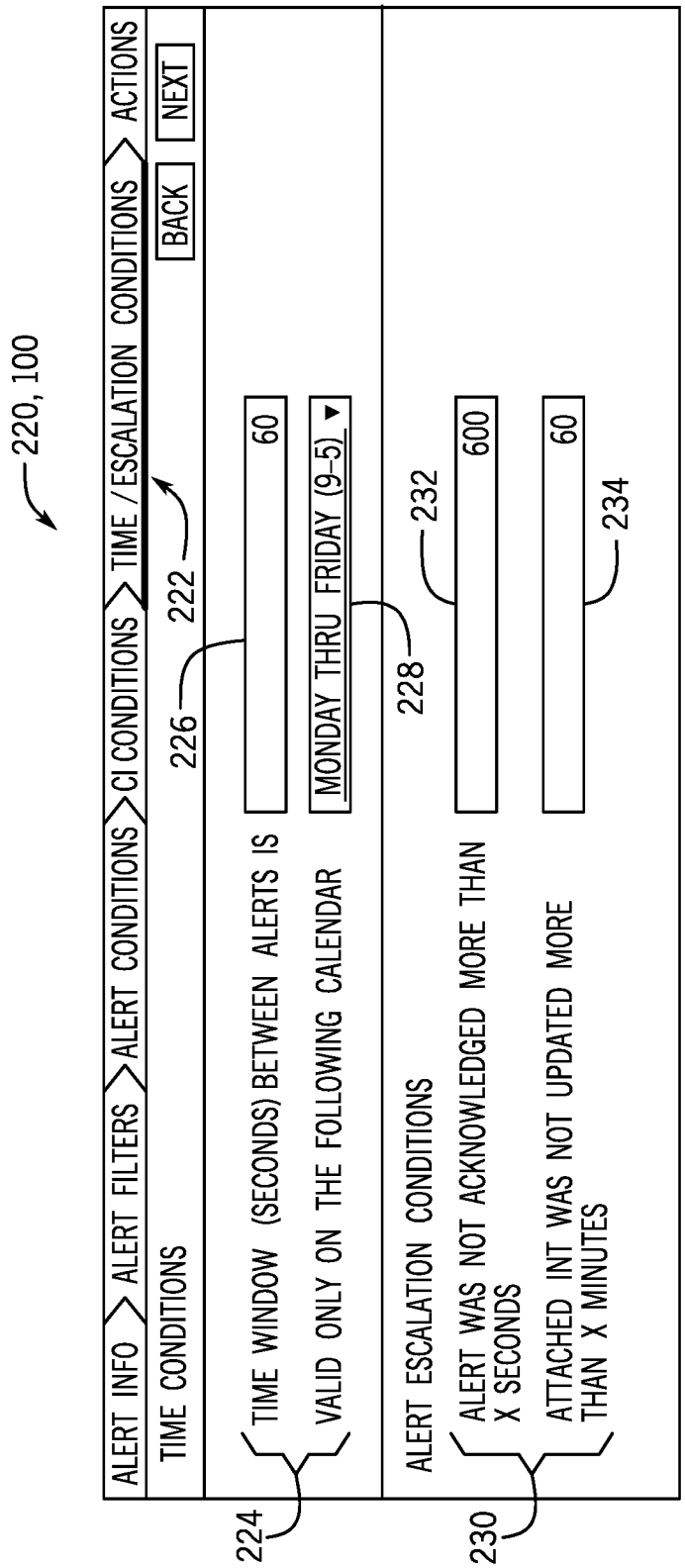

FIG. 9 illustrates a fifth screen 220 of the embodiment of the alert rule creation GUI 100, wherein a "Time/Escalations Conditions" tab 222 is selected. As such, using the fifth screen 220, a user can define time-based alert conditions for the new alert rule. The illustrated fifth screen 220 includes a first set of user input mechanisms 224, including a text box 226 and a drop-down list 228. It may be noted that the text box 226 may only be presented or assessable when the alert rule includes two filters (e.g., filter 1 that defines alert A, and filter 2 that defines alert B). The text box 226 is designed to optionally receive a positive integer value from the user indicating a time window between the generation of alert A and alert B. The drop-down list 228 is populated with a number of different user-selectable calendar settings, such as "Monday-Friday", "weekends", "holidays."

The illustrated fifth screen 220 illustrated in FIG. 9 also includes a second set of user input mechanisms 230 related to escalation condition. The second set of user input mechanisms 230 include a first text box 232 and a second text box 234. It may be noted that the alert escalation portion of the fifth screen 220 may only be presented or assessable when the alert rule includes more than one alert condition. The first text box 232 is designed to receive a positive integer value from the user indicating that the alert has not been acknowledged in the indicated number of seconds. The second text box 234 is designed to receive a positive integer value from the user indicating that an INT associated with the alert has not been updated in the indicated number of minutes.

Figure 10:
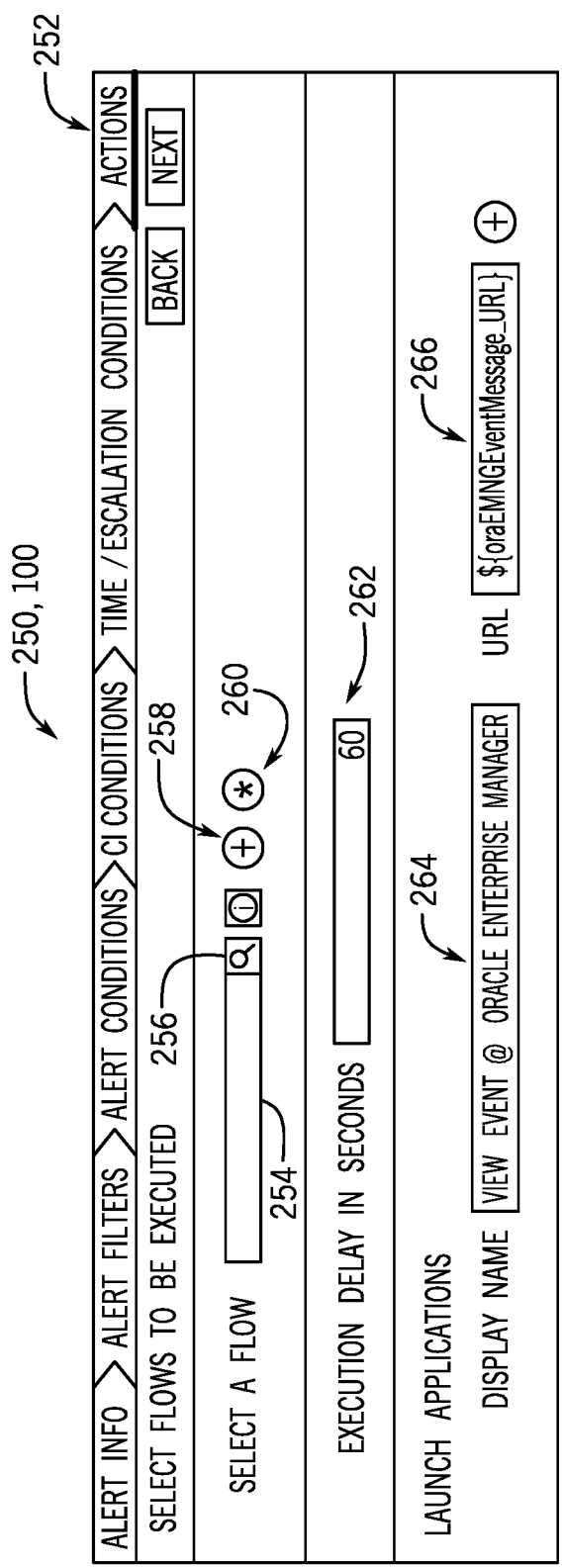

FIG. 10 illustrates a sixth screen 250 of the embodiment of the alert rule creation GUI 100, wherein a "Actions" tab 252 is selected. As such, using the sixth screen 250, a user can define actions of the new alert rule. The illustrated sixth screen 250 includes a first text box 254 that is designed to receive an indication of a particular workflow (also referred to herein as flow) to be executed in response to the "if" portion of the alert rule being satisfied. The first text box 254 is associated with a search button 256 that enables the user to search for an existing workflow using another screen of the GUI 100. Additionally, in response to receiving a user input from an "add workflow" button 258, the sixth screen 250 adds additional instances of the first text box 254, such that the user can indicate multiple workflows are to be executed as part of the alert rule. In certain embodiments, the first text box 254 may be associated with a "copy and modify" button 260 that makes a copy of an indicated workflow, and opens the new copy in a workflow designer for modification by the user, as illustrated in FIG. 10. The sixth screen 250 includes a second text box 262 that is designed to receive a positive integer value indicative of a delay in seconds between the determination that the "if" portion of the alert rule is true, and the execution of any alert rule actions. The sixth screen 250 further includes a third text box 264 and a fourth text box 266 that are designed to respectively receive text strings from the user indicating a display name and a Uniform Resource Locator (URL) of an application that will be launched as an alert rule action.

Figure 11:
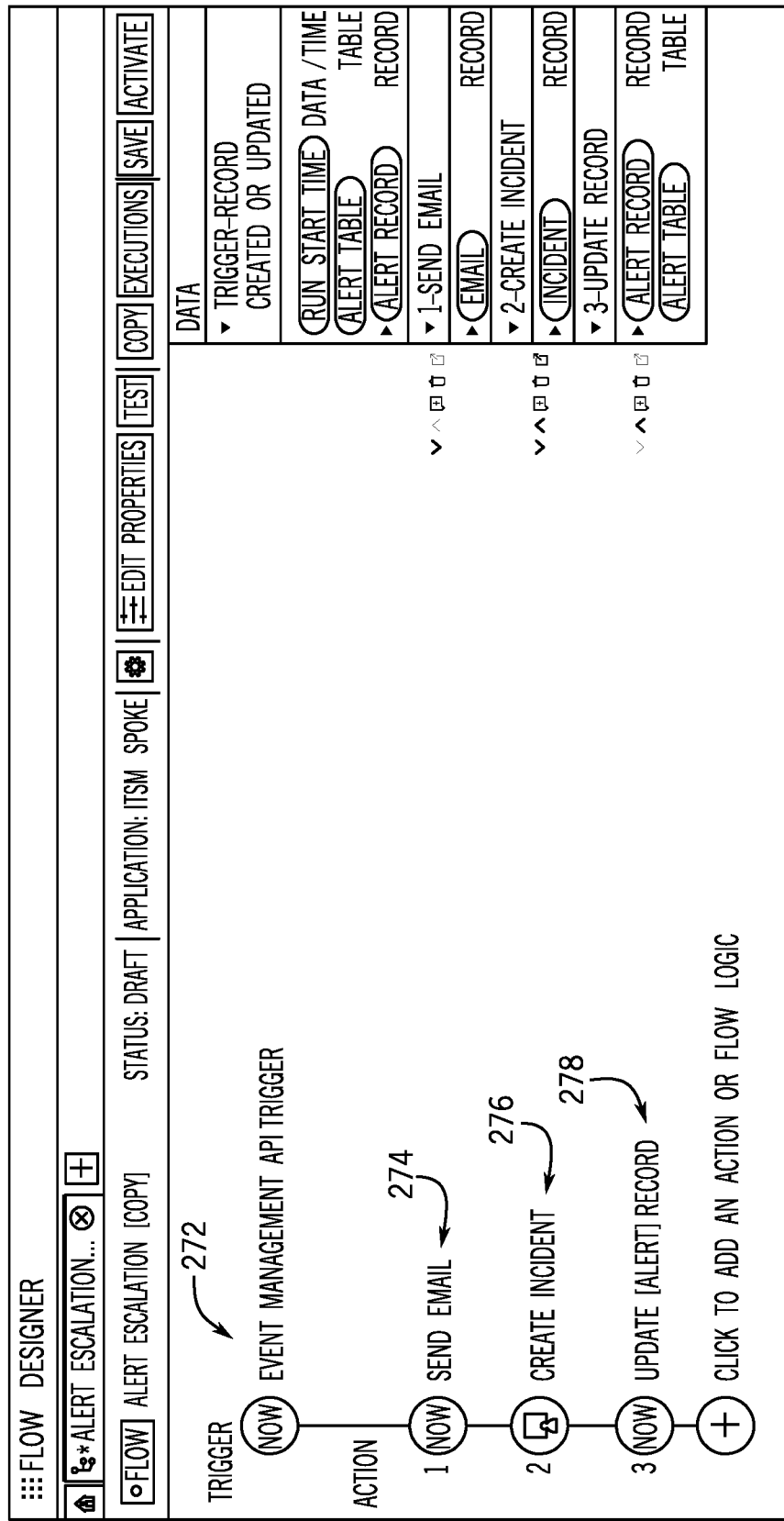

FIG. 11 illustrates a screen 270 of an embodiment of a workflow creation GUI 271, which enables a user to create and define a workflow as an alert rule action. The illustrated screen 270 may be presented to the user, for example, in response to the user selecting the "copy and modify" button 260 discussed above with respect to FIG. 9. The illustrated screen 270 includes a particular workflow 272 that has been defined by the user and that will be executed as an action of an alert rule. The illustrated workflow 272 includes three steps that are performed: a first step 274 in which an email is prepared and sent, a second step 276 in which an INT is created, and a third step 278 in which the alert is updated. Additionally, since the entire alert context is available during execution of the illustrated workflow 272, then one or more of the steps 274, 276, and 278 may utilize any suitable piece of alert context (e.g., alert severity, CI class, alert acknowledged) to perform these steps.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computing system hosting a configuration management database (CMDB) platform, comprising:
a client instance including an alert table, an alert rules table, a configuration items (CI) table, and an alert rules engine, wherein, for each alert rule stored in the alert rules table, the alert rules engine is configured to perform steps comprising:
apply a first filter of the alert rule to alerts stored in the alert table to select a first alert based on context of the first alert, wherein the context of the first alert includes details regarding the first alert and associated configuration items (CIs);
apply a second filter of the alert rule to the alerts stored in the alert table to select a second alert based on context of the second alert, wherein the context of the second alert includes details regarding the second alert and associated CIs;
evaluate at least one condition of the alert rule using the context of the first alert and the context of the second alert, wherein the at least one condition includes a time condition; and
in response to evaluating the at least one condition of the alert rule to be true, performing at least one action of the alert rule using the context of the first alert and the context of the second alert,
wherein the context of the first or second alert includes an alert severity, an alert criticality, an alert name, an identity of the CI that generated the alert, or a class of the CI that generated the alert, or a combination thereof, of the first or second alert.

2. The computing system of claim 1, wherein, to evaluate the at least one condition, the alert rules engine is configured to: determine whether at least one numeric field in the context of the first alert or in the context of the second alert has a value that is above or below a threshold value.

3. The computing system of claim 1, wherein the at least one condition includes a time condition based on a first time associated with the first alert and a second time associated with the second alert.

4. The computing system of claim 3, wherein the time condition is based on a particular calendar setting of the first time or second time.

5. The computing system of claim 1, wherein the at least one condition includes a CI condition based on a relationship between a first CI associated with the first alert and a second CI associated with the second alert.

6. The computing system of claim 5, wherein the relationship includes parent-child or child-parent relationship.

7. The computing system of claim 1, wherein the at least one condition includes an escalation condition based on an amount of time that passes with the first alert or the second alert not being acknowledged.

8. The computing system of claim 1, wherein the action comprises one or more workflows, wherein the workflow comprises sending an email, creating an incident, updating the first or second alert, or a combination thereof.

9. The computing system of claim 1, wherein the client instance is configured to:
receive one or more requests to create the alert rule; and
define the first filter, the second filter, the at least one condition, and at least one action of alert rule based on the one or more requests, wherein the first filter, the second filter, the at least one condition, and the at least one action each refer to the context of the first alert, or the context of the second alert, or a combination thereof.

10. The computing system of claim 9, comprising a client device communicatively coupled to the client instance, wherein the client instance is configured to send, to the client device, a list of potential filters and conditions for the alert rule before receiving the one or more requests, from the client device, to create the alert rule.

11. A method of managing alerts in a client instance associated with a configuration management database (CMDB) platform, comprising:
applying a first filter of an alert rule to a plurality of alerts associated with the CMDB platform to select a first alert based on context of the first alert, wherein the context of the first alert includes details regarding the first alert and associated configuration items (CIs);
applying a second filter of the alert rule to the plurality of alerts associated with the CMDB platform to select a second alert based on context of the second alert, wherein the context of the second alert includes details regarding the second alert and associated CIs;
evaluating at least one condition of the alert rule using the context of the first alert and the context of the second alert, wherein the at least one condition includes a time condition; and
in response to evaluating the at least one condition of the alert rule to be true, performing at least one action of the alert rule using the context of the first alert and the context of the second alert,
wherein the context of the first or second alert includes an alert severity, an alert criticality, an alert name, an identity of the CI that generated the alert, or a class of the CI that generated the alert, or a combination thereof, of the first or second alert.

12. The method of claim 11, wherein evaluating the time condition comprises determining whether the first alert occurred during a predetermined time window.

13. The method of claim 12, wherein the predetermined time window is correlated with a time at which the second alert is generated.

14. The method of claim 12, wherein the predetermined time window defines a calendar setting, wherein the calendar setting comprises one or more of a weekday, a weekend, a holiday.

15. The method of claim 11, wherein evaluating the at least one condition includes determining whether a total number of events or secondary alerts associated with the first alert is greater than a first predetermined value, or determining whether a total number of events or secondary alerts associated with the second alert is greater than a second predetermined value, or a combination thereof.

16. The method of claim 11, wherein the at least one action comprises adding the first alert to a hierarchy group or a peer-to-peer group relative to the second alert.

17. A non-transitory, computer-readable medium storing instructions executable by a processor of a computing system to manage alerts in a client instance associated with a configuration management database (CMDB) platform, the instructions comprising:
  instructions to apply a first filter of an alert rule to a plurality of alerts associated with the CMDB platform to select a first alert based on context of the first alert, wherein the context of the first alert includes details regarding the first alert and associated configuration items (CIs);
  instructions to apply a second filter of the alert rule to the plurality of alerts associated with the CMDB platform to select a second alert based on context of the second alert, wherein the context of the second alert includes details regarding the second alert and associated CIs;
  instructions to evaluate at least one condition of the alert rule using the context of the first alert and the context of the second alert, wherein the at least one condition comprises a time condition; and
  instructions to perform at least one action of the alert rule using the context of the first alert and the context of the second alert, in response to evaluating the at least one condition of the alert rule to be true,
  wherein the context of the first or second alert includes an alert severity, an alert criticality, an alert name, an identity of the CI that generated the alert, or a class of the CI that generated the alert, or a combination thereof, of the first or second alert.

18. The computer-readable medium of claim 17, wherein the instructions comprise:
  instructions to receive, from a communicatively coupled client device, at least one request to create an alert rule; and
  instructions to define the first filter, the second filter, the at least one condition, and at least one action of alert rule based on the at least one request, wherein the first filter, the second filter, the at least one condition, and the at least one action each reference the context of the first alert, or the context of the second alert, or a combination thereof.

19. The computer-readable medium of claim 17, wherein to evaluate the time condition of the alert rule comprises, the instructions comprise:
  instructions to determine whether the first alert occurred during a predetermined time window, wherein the predetermined time window is correlated with a time at which the second alert is generated, and wherein the predetermined time window defines a calendar setting.

* * * * *